(12) United States Patent
Porter

(10) Patent No.: US 8,391,465 B1
(45) Date of Patent: Mar. 5, 2013

(54) CUSTOMER CARE CALL ROUTING

(75) Inventor: Shane Porter, Liberty, MO (US)

(73) Assignee: Spring Communications Company L.P., Overland Park, KS (US)

( * ) Notice: Subject to any disclaimer, the term of this patent is extended or adjusted under 35 U.S.C. 154(b) by 208 days.

(21) Appl. No.: 13/016,714

(22) Filed: Jan. 28, 2011

(51) Int. Cl.
*H04M 3/00* (2006.01)

(52) U.S. Cl. .......... 379/265.11; 379/265.05; 379/266.08

(58) Field of Classification Search ............. 379/256.01, 379/256.05, 265.11, 266.01, 266.08
See application file for complete search history.

(56) References Cited

U.S. PATENT DOCUMENTS

| | | | | |
|---|---|---|---|---|
| 6,044,144 A | * | 3/2000 | Becker et al. | 379/265.02 |
| 6,373,836 B1 | * | 4/2002 | Deryugin et al. | 370/352 |
| 6,714,642 B2 | * | 3/2004 | Dhir et al. | 379/265.02 |
| 7,630,487 B2 | * | 12/2009 | Shaffer et al. | 379/266.03 |
| 7,738,646 B2 | * | 6/2010 | Sundaram et al. | 379/220.01 |
| 2003/0095652 A1 | * | 5/2003 | Mengshoel et al. | 379/265.06 |
| 2008/0040196 A1 | * | 2/2008 | Coon et al. | 705/10 |
| 2011/0255553 A1 | * | 10/2011 | Bobba et al. | 370/429 |

\* cited by examiner

*Primary Examiner* — Ahmad Matar
*Assistant Examiner* — Oleg Asanbayev

(57) ABSTRACT

A system for automatically collecting, displaying, analyzing and projecting data associated with inbound and outbound calls at a plurality of customer care call centers is presented. The system comprises a computer system, a memory, and an application stored in the memory that, when executed by the computer system, stores inbound call metrics about calls to a plurality of customer care call centers, and stores outbound call metrics about calls directed outbound from the plurality of customer care call centers. The system further determines a current call handling status of the plurality of customer care call centers, projects a future status of the plurality of customer care call centers based on the inbound call metrics, on the outbound call metrics, on the current call handling status, and on a call handling plan, and performs an action based on the projected future status of the plurality of customer care call centers.

10 Claims, 4 Drawing Sheets

CUSTOMER CARE CALL ROUTING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication over networks of specialized base stations known as cell towers or sites. In addition to the standard voice function of a mobile telephone, current mobile phones and other similar portable electronic devices may support additional services including short message service (SMS) for text messaging, electronic mail, and packet switching for access to the Internet. Other services include gaming, Bluetooth™, infrared, camera with video recorder, multimedia messaging services (MMS) for sending and receiving photographs and downloading of video, MPEG-1 Audio Layer 3 (MP3) for audio storage, radio, and global positioning system services. Current mobile telephones and other portable electronic devices connect to cellular networks consisting of switching points and base stations owned by mobile network operators. Mobile phones, personal digital assistants (PDA), and other similar devices also may provide for memorandum and document recording, personal organizer and personal digital assistant functions, and instant messaging services, and may serve as wireless modems for personal computers and as a console to online games. Mobile network operators may provide support for their customers by using call centers to receive calls concerning a wide range of customer needs. The call centers may receive high volumes of calls and employ numerous service agents to handle the calls.

SUMMARY

In an embodiment, a system is disclosed, comprising a computer system, an at least one memory, and an application stored in the at least one memory. When the application is executed by the computer system, it stores inbound call metrics about calls directed to a plurality of customer care call centers, stores outbound call metrics about calls directed outbound and originated from the plurality of customer care call centers, and determines a current call handling status of the plurality of customer care call centers. When the application is executed by the computer system, it further projects a future status of the plurality of customer care call centers based on the inbound call metrics, based on the outbound call metrics, based on the current call handling status, and based on a call handling plan. When the application is executed by the computer system, it further performs an action based on the projected future status of the plurality of customer care call centers.

In an embodiment, a method of customer care call handling is disclosed. The method of customer care call handling comprises automatically determining a current customer care call volume for each of a plurality of customer care call categories and for each of a plurality of customer care call centers, based at least in part on collecting customer care call metrics from each of a plurality of intelligent call management platforms, wherein each intelligent call management platform selectively routes customer care calls to some of the plurality of customer care call centers. The method of customer care call handling further comprises automatically comparing the current customer care call volumes to a planned customer care call volume, automatically identifying a first customer care call center having a first current customer care call volume associated with a first customer care call category that is higher than a corresponding first planned customer care call volume, and automatically identifying a second customer care call center having a second current customer care call volume lower than a corresponding second planned customer care call volume. The method of customer care call handling further comprises automatically identifying a first customer care call agent in the second customer care call center associated with a skill used in handling customer care calls of the first customer care call category, and automatically redirecting some of the customer care calls of the first customer care call category away from the first customer care call center and to the first customer care call agent in the second customer care call center.

In an embodiment, a system is disclosed, comprising a processor, a memory, and an application stored in the memory. When the application is executed by the processor, it collects customer care call metrics from at least three intelligent call management platforms, wherein each intelligent call management platform selectively routes customer care calls to an associated plurality of customer care call centers. When the application is executed by the processor, it further accesses historical customer care call metrics, accesses forecasts of customer care call volumes at the plurality of customer care call centers associated with the at least three intelligent call management platforms, and accesses plans of customer care call agent staffing. When the application is executed by the processor, it further analyzes the customer care call metrics, the historical customer care call metrics, the forecasts of customer care call volumes, and customer care call agent staffing, and based on a result of the analysis, reassigns at least one customer care call agent from a first customer care call category to a second customer care call category.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
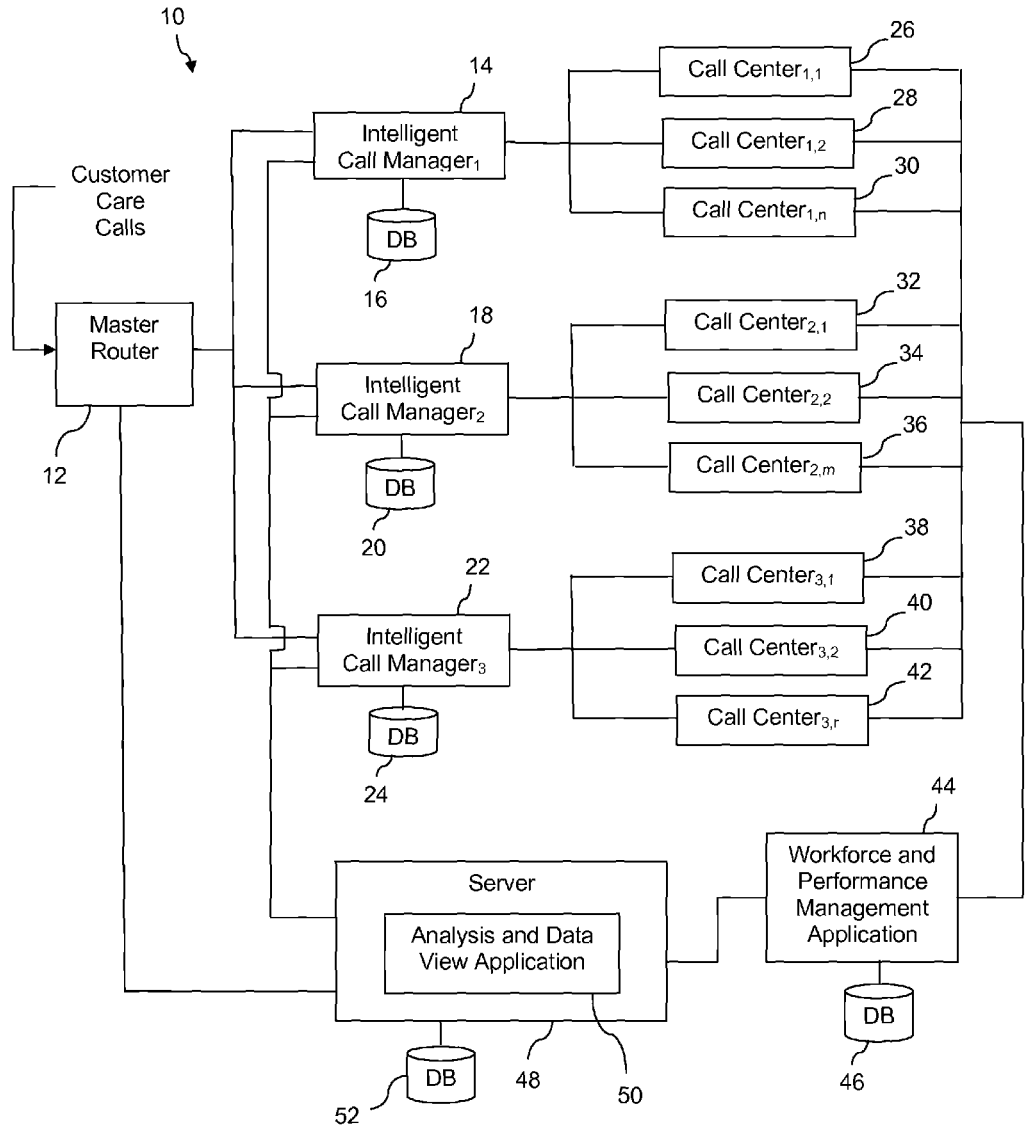
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for automatically collecting, displaying, analyzing and taking actions based on data associated with inbound and outbound calls at a plurality of customer care call centers is described. The system may comprise a computer system, at least one memory store, and an analysis and data view application. The calls may be originated by mobile communication service customers, and the calls may be referred to as customer care calls. A mobile network operator may use the system to plan and adjust staffing levels and personnel assignments to more accurately match customer demand for service at the plurality of customer care call centers. The mobile network operator may use one or more intelligent call manager platforms to route incoming calls across the plurality of customer care call centers. More than one intelligent call manager platform may be needed to handle all incoming calls due to the large number of customer care call centers, which for example, may be as many as 45 or more. Alternatively, more than one intelligent call manger platform may be used because of merging previously separate groups of customer care call centers, from two different enterprises for example, or because of a need to merge both in-house and outsourced or contracted customer care call centers.

In an embodiment, a first incoming call may be routed by a first intelligent call manager platform to a first customer care call center based on the values of a plurality of metrics and criteria. For example, the metrics and criteria may comprise one or more of the type of service requested or problem described by the caller, the number of appropriately trained customer care call agents available at the first customer care call center, the waiting times for calls before they are handled by the customer care call agents assigned to the first customer care call center, the number of calls answered before their wait time exceeds a maximum acceptable value, the volume of incoming calls to the first intelligent call manager platform, or a priority assigned to the first customer care call center. In a similar manner, a second incoming call may be routed by a second intelligent call manager platform to a second customer care call center based on the values of a plurality of metrics and criteria. In an embodiment, the system may automatically retrieve data and metrics from the first intelligent call manager platform and automatically retrieve data and metrics from the second intelligent call manager platform and automatically store the retrieved data and metrics in a data store linked to the analysis and data view application.

The system's analysis and data view application may display at least some of the stored data and metrics in real time for a plurality of users of the system. Real time in general may have a variety of meanings, but in this context it refers to information that is updated one of at least once a minute, at least once every five minutes, or at least once every ten minutes. The displayed data and metrics may be viewed in real time on a display screen located at any of the plurality of customer care call centers and the displayed data and metrics may be concerning calls that were routed by any of the intelligent call manager platforms.

The analysis and data view application may combine the retrieved data and metrics to create new data fields that did not exist or could not be displayed by a first intelligent call manager platform. For example, a first intelligent call manager platform may have stored data about both inbound and outbound calls, but it may only have the ability to display information about inbound calls that it routed to customer care call centers. In an embodiment, the analysis and data view application may create data fields for inbound calls, outbound calls and total calls wherein the total calls field may represent the combined total of both inbound and outbound calls. Outbound calls may be an important part of the activities of agents working at customer care call centers, taking up to as much as fifteen percent or more of their time. For example, an agent working at a first customer care call center may need to ask a customer to hang up so the agent can then call the customer back, on an outbound call, as part of a diagnostic test. For another example, an agent working at a first customer care call center may be assigned the task of making outbound calls to existing customers in order to offer new service plans or equipment upgrades to the existing customers. The ability to display, in real time, both the inbound and outbound call data as well as the combined total data may give a more accurate picture of the occupancy of agents working at customer care call centers than a display showing just inbound calls, wherein occupancy refers to how much of the time an agent is busy or working.

The analysis and data view application further may have the capability to define user groups and to restrict access for members of a first user group to only a first portion of the data and metrics stored in the data store and to restrict access for members of a second user group to only a second portion of the data and metrics stored in the data store. For example, the first user group may be one of a business segment within the mobile network operator, or a category of service, such as general customer care, white glove customer care, technology assistance, billing, or account services. Members of the first user group only may be interested in data and metrics that relate directly to their particular business segment. In another example, the first user group may be one of a first group of contracted customer care call centers that legally may not have access to information about a second group of contracted customer care call centers.

In an embodiment, the analysis and data view application may analyze the real time data and metrics to determine a current call handling status of the plurality of customer care call centers. For example, the current call handling status of a first user group may be the size of the queue for incoming calls waiting to be handled by the first user group. For another example, the current call handling status of a second user group may be the service level for the second user group wherein the service level is the number of customer care calls that have experienced no more than a 30 second wait before being answered by a customer care call agent. The analysis and data view application may further project a future call handling status for the plurality of customer care call centers based on trends of inbound call metrics and outbound call metrics, based on the current, real time, call handling status, and based on a call handling plan. In an embodiment, the analysis and data view application may retrieve the call handling plan from a data store associated with a workforce and performance management application such as an IEX software application. The call handling plan may include future customer care call center staffing levels, future customer care call category assignments and future customer care call agent assignments.

The call handling plans stored in the data store associated with the workforce and performance management application may be based on data and metrics that are not up to date in real time, but instead may be based on projected values of data and metrics. The analysis and data view application may compare the projected values of data and metrics made by the workforce and performance management application to the real time values of data and metrics stored in the data store associated with the analysis and data view application. The analysis and data view application may further determine the size of discrepancies between the real time call handling status and the projected call handling status and take actions for discrepancies larger than threshold values or for discrepancies projected to become larger than threshold values. The actions taken may comprise changes in call handling plans such as adjustments in staffing levels at customer care call centers, adjustments in assignments for customer care call categories, or adjustments in assignments for customer care call agents. The actions taken may further comprise redirecting at least a portion of a category of customer care calls from a first customer care call agent to a second customer care call agent, from a first customer care call center to a second customer care call center, or from a first intelligent call manager platform to a second intelligent call manager platform.

The analysis and data view application further may automatically grant an exception for the actions taken, wherein the exception is associated with providing contractual relief to a customer care call center. For example, the analysis and data view application may determine that the queue for calls to a first customer care call center is too large and further project that it will remain too large and decide to reassign or re-gate some customer care call agents from a second customer care call center, where the queue is lower and projected to remain lower, to the first customer care call center. The analysis and data view application further may determine that there is, for example, an issue that is out of the control of the first customer care call center, such as a network problem, which is contributing to the longer queue at the first customer care call center and grant an exception to the first customer care call center that will excuse them from paying a penalty normally required by their contract for increasing staffing levels. The analysis and data view application further may change or adjust at least some of the algorithms used to predict future staffing levels and assignments, in order to reduce future discrepancies, and associated actions and changes.

Turning now to FIG. 1, a system 10 for handling customer care calls is described. In an embodiment, the system 10 may comprise a computer server 48, at least one data store 52, an analysis and data view application 50, a master router 12, two or more intelligent call manager platforms 14 and 18 with associated data stores 16 and 20, a plurality of customer care call centers 26-42, and a workforce and performance management application 44 and associated data store 46. In an embodiment, the system 10 automatically retrieves customer care call data and metrics from one or more of a first intelligent call manager platform 14, a first data store 16, a second intelligent call manager platform 18, a second data store 20, a third intelligent call manager platform 22, and a third data store 24. The system 10 automatically stores the retrieved customer care call data and metrics in a data store 52 linked to the server 48. The first intelligent call manager platform 14 selectively routes inbound calls to or outbound calls away from any number of first customer care call centers 26, 28 or 30. The second intelligent call manager platform 18 selectively routes inbound calls to or outbound calls away from any number of second customer care call centers 32, 34 or 36. The third intelligent call manager platform 22 selectively routes inbound calls to or outbound calls away from any number of third customer care call centers 38, 40 or 42. It is understood that there may be any number of intelligent call managers 14, 18, or 22 and that there may be any number of customer care call centers 26, 28 or 30, 32, 34 or 36, and 38, 40 or 42.

In an embodiment, a first inbound customer care call is routed by a master router 12 to any one of the first intelligent call manager platform 14, the second intelligent call manager platform 18, and the third intelligent call manager platform 22. More than one intelligent call manager platform may be needed to handle all incoming calls to the master router 12 due to the large number of customer care call centers 26, 28 or 30, 32, 34 or 36, and 38, 40 or 42, which for example, may number as many as 45 or more. Alternatively, more than one intelligent call manger platform may be used because of merging previously separate groups of customer care call centers 26, 28 or 30, 32, 34 or 36, and 38, 40 or 42, from a plurality of different enterprises, for example, or because of a need to merge in-house customer care call centers with outsourced or contracted customer care call centers.

Mobile network operators may use and/or develop software applications to monitor and track customer service metrics at the call centers such as incoming call volumes, wait times experienced by callers, number of appropriately trained service agents, or length of time needed to complete service calls. It is understood that these metrics represent the performance of an individual call center. For example, the wait times experienced by callers may relate to a wait time experienced by callers whose care call is routed to the customer care call center 26, for example an average wait time. The mobile network operators may further use and/or develop software applications to analyze previous and real time customer service metrics and their trends and to predict future values and trends of the service metrics. These predictions may be used to plan or change staffing levels and/or staffing assignments at the call centers in order to improve one or more of the service metrics.

In an embodiment, a first inbound call is received by the first intelligent call manager platform 14, pegged or recorded as received by a counter whose values are stored in the first data store 16 and selectively routed by the first intelligent call manager platform 14 to a first customer care call center 26 based on one or more of the values of a plurality of customer care call metrics and criteria, for example by comparing corresponding metrics associated with call centers 26, 28, 30, for example comparing between an average call wait time at each of the call centers 26, 28, 30. For example, the customer care call metrics and criteria may comprise one or more of the type of service requested or problem described by the first caller, the number of appropriately trained customer care call agents available at the first customer care call center 26, the waiting times for calls before they are handled at the first customer care call center 26, the number of calls answered before their wait time exceeded a maximum acceptable value, the volume of inbound calls to the first intelligent call manager platform 14, or a priority assigned to the first customer care call center 26. The analysis and data view application 50 displays at least some of the data and metrics stored in the data store 52 for a plurality of users of the system. In an embodiment, the analysis and data view application displays at least some of the data and metrics stored in the data store 52 in real time. Real time in general can have a variety of meanings, but in this context real time refers to updating the display one of at least once a minute, at least once every five minutes, or at least once every ten minutes. The displayed data and metrics may be viewed on any of a plurality of display screens located at any of the plurality of customer care call centers 26, 28 or 30, 32, 34 or 36, and 38, 40 or 42. The displayed data and metrics relate to inbound and outbound calls that were routed by any of the intelligent call manager platforms 14, 18 or 22.

The analysis and data view application 50 may combine the data and metrics retrieved from the first data store 16 associated with the first intelligent call manager platform 14, to create new data fields in the data store 52 that did not exist in the first data store 16 or could not be displayed by the first intelligent call manager platform 14. For example, the first intelligent call manager platform 14 may have stored real time data about both inbound and outbound calls in the first data store 16, but it may only have the ability to display real time data about the inbound calls that it routed to the first customer care call center 26. In an embodiment, the analysis and data view application 50 may create data fields in the data store 52 for inbound calls, outbound calls and total calls wherein the total calls field may represent the combined total of both inbound and outbound calls. Outbound calls may be an important part of the activities of customer care call agents working at customer care call centers, taking up to as much as fifteen percent or more of their time. For example, a first customer care call agent working at the first customer care call center 26 may need to ask a first customer to hang up so the first customer care call agent can then call the first customer back, on an outbound call routed by the first intelligent call manager platform 14, as part of a diagnostic test. For another example, a first customer care call agent working at the first customer care call center 26 may be assigned a task of making outbound calls to existing customers in order to offer new service plans or equipment upgrades to the existing customers.

In an embodiment, the ability of the analysis and data view application 50 to display, in real time, both the inbound and outbound call data as well as the combined total call data may give a more accurate picture of the occupancy of agents working at the first customer care call center 26 than a display showing just the inbound call data, wherein occupancy refers to how much of the time a customer care call agent is busy or working. In an embodiment, the ability of the analysis and data view application 50 to display, in real time, both the inbound and outbound call data and metrics as well as the combined total call data and metrics may give a more accurate picture of the current availability of a first customer care call agent assigned to a first customer call center 26 than a display showing just the inbound call data.

In an embodiment, the analysis and data view application 50 may selectively adjust or change the time of day associated with any of a plurality of real time customer care call data items or metrics it retrieves from one of a first intelligent call manager 14 and a first data store 16, so that the time of day associated with any of the plurality of real time customer care call data items or metrics will be consistent with a one common time zone. For example, the analysis and data view application 50 may subtract one hour from the time of day associated with any of a plurality of real time customer care call data items it retrieved from a first intelligent call manager 14 wherein the real time customer care call data item concerned a customer care call made from a location situated in the Eastern Standard Time Zone of the United States. The subtraction of the one hour may result in converting the time of day associated with the real time customer care call data item from Eastern Standard Time (EST) to Central Standard Time (CST). While the one common time zone in this example is the Central Standard Time Zone of the United States, it is understood that the one common time zone can be any of a plurality of standard time zones used in any of a plurality of countries and cities. The adjustment of the time of day to a one common time zone may further result in better, more easily, and more quickly understood, displays or graphs of trends for one or more of a plurality of real time customer care call data items or metrics.

The analysis and data view application 50 further may have the capability to define user groups and to restrict access for members of a first user group to only a first portion of the data and metrics stored in the data store 52 and to restrict access for members of a second user group to only a second portion of the data and metrics stored in the data store 52. For example, the first user group may comprise one of a business segment within the mobile network operator, or a category of service, such as general customer care, white glove customer care, technology, billing, or account services. Members of the first user group only may be interested in or have a need to know data and metrics that relate directly to their first business segment. The data that relate directly to their first business segment, however, may comprise real time data and metrics a first portion of which is stored in a first data store 16 and a second portion of which is stored in a second data store 20. In an embodiment, the analysis and data view application 50 may display to members of the first user group real time data and metrics stored in the data store 52 that only relate to the first business segment and which were retrieved partly from the first data store 16 and partly from the second data store 20. In another example, the first user group may comprise one of a first group of contracted customer care call centers that legally may not have access to at least some information, data, and metrics about a second group of contracted customer care call centers. In an embodiment, the analysis and data view application 50 may assign a first user group to all the customer care call agents assigned to work for a first group of contracted customer care call centers and display to the members of the first user group only data and metrics stored in the data store 52 that directly relate to the first group of contracted customer care call centers and do not reveal any restricted information about the second group of contracted customer care call centers.

In an embodiment, the analysis and data view application 50 may retrieve a first call handling plan from the data store 46 associated with a workforce and performance management application 44 wherein the first call handling plan comprises one of current or future staffing levels for a first customer care call center 26, and current or future customer care call agent assignments for a first customer care call center 26. For example, the workforce and performance management application 44 may be an IEX software application. The workforce and performance management application 44 automatically calculates and/or determines projections of call center metrics based on past metrics and further develops call center staffing and management plans based on these projections. In an embodiment, the call center metrics that the workforce and performance management application 44 analyzes, however, are at least 30 minutes old. Consequently the projections developed by the workforce and performance management application 44 develops are lagging projections, and hence the plans developed based on these lagging projections themselves lag the current call center environments by at least 30 minutes.

In an embodiment, the analysis and data view application 50 compares the previously projected values of data and metrics made by the workforce and performance management application 44 to the real time values of data and metrics stored in the data store 52 associated with the analysis and data view application 50. The analysis and data view application 50 further determines the size of any discrepancy or difference between the real time value of a first datum or metric and the previously projected value of the first datum or metric and takes an action when a first discrepancy is larger than a first threshold value or when a first discrepancy is projected to become larger than a first threshold value. The size of the first threshold value may be one of a default value assigned by the analysis and data view application 50 for a plurality of data and metrics, a value that was assigned for just the first datum or metric by a member of a first user group or by a system administrator of the server 48, or a value that was automatically adjusted for the first datum or metric by an algorithm in the analysis and data view application 50.

Without wishing to be bound by theory, the interaction between the workforce and performance management application 44 and the analysis and data view application 50 may be abstracted, according to one way of thinking, as the workforce and performance management application 44 providing a kind of low frequency function and the analysis and data view application 50 providing a higher frequency function by perturbing and/or making adjustments to what the workforce and performance management application 44 provides. It is understood that this abstraction is provided to aid understanding of the interactions and is not meant to be binding. This abstraction may not be fully descriptive and may not account for some aspects of the behavior of system 10. For example, in an embodiment, the workforce and performance management application 44 does not receive metrics about outgoing calls and hence does not generate projections and plans based on outgoing calls. Thus, the analysis and data view application 50, when it further takes into account the metrics associated with outgoing calls, does not so much adapt a lower frequency response of the workforce and performance management application 44 to the outgoing calls (because the workforce and performance management application 44 in an embodiment takes no cognizance of the outgoing call metrics) but rather is making minor control adjustments, minor course corrections.

In an embodiment, the action taken may comprise a change in the first call handling plan such as an adjustment in the current or future staffing levels at the first customer care call center 26, an adjustment in the current or future assignments of customer care call agents to the first customer care call center 26, an adjustment in the current or future assignments of customer care call agents according to call types or categories handled within the first customer care call center 26, or an adjustment in the current or future daily work hours requested of one or more customer care call agents assigned to the first customer care call center 26, such as overtime requests, early release requests or shift assignment changes. The action taken may further comprise redirecting at least a portion of a category of customer care calls from a first customer care call agent to a second customer care call agent, from a first customer care call center 26 to a second customer care call center 28, or from a first intelligent call manager platform 14 to a second intelligent call manager platform 18.

In an embodiment, after an action is taken, the analysis and data view application 50 determines and displays the up to date, real time, values of data and metrics and the up to date, real time, size of any discrepancy or difference to the first call handling plan that was larger than a first threshold value or projected to be larger than a first threshold value prior to the action. The analysis and data view application 50 thereby determines and displays data in real time that promote the evaluation and determination of the successfulness of the action after it is taken.

In an embodiment, the action or actions taken by the analysis and data view application 50 may promote improving two or more operating parameters and/or metrics which may be generally thought to be mutually antagonistic. For example, the analysis and data view application 50 may make changes in a first call handling plan based on real time values of data and metrics, and at least some of the results of the changes may be improved values for the metric of occupancy and improved values for the metric of service level over a same time interval for the first customer care call center 26. Further, it may be generally thought that since occupancy is a measure of how busy customer care call agents remain over a time interval, and since service level is a measure of how many customer care calls are answered in a timely manner over a time interval, that the values for these two metrics cannot both be improved over the same time interval. However, in an embodiment, the recording and use of accurate, real time values for customer care call data and metrics may enable the analysis and data view application 50 to make timely changes and adjustments to the first call handling plan that result in more optimum staffing levels and more optimum personnel assignments at the first customer care call center 26 at some of its busy times. This may result in more agents staying busy while at the same time customer care calls are answered more quickly, thereby improving both the occupancy metric and the service level metric during a common time interval.

In an embodiment, the analysis and data view application 50 further may automatically grant an exception for an action it takes, wherein the exception is associated with providing contractual relief to a customer care call center. The contractual terms that govern the financial remuneration for a first customer care call center 26 may include a penalty for one or more of a staffing level that is too high or too low compared to the staffing level in the call handling plan, a service level that is too low wherein the service level is the number of calls answered after less waiting time than a value set by the contractual terms, or an amount of overtime worked by at least one of the customer care call agents assigned to the first customer care call center 26 that is greater than the maximum overtime allowed contractually. For example, the analysis and data view application 50 may determine that a waiting queue for calls to a first customer care call center 26 is larger than desirable and further project that it will remain too large to be desirable in the future and decide to automatically reassign, or re-gate, at least some customer care call agents previously assigned to a second customer care call center 28, where the waiting queue for calls is lower and projected to remain lower, to the first customer care call center 26. The analysis and data view application 50 may further determine that, for example, an issue has occurred that is out of the control of the first customer care call center 26, such as an equipment problem at the mobile network operator, which is contributing to the larger waiting queue for calls at the first customer care call center 26, and grant an exception to the first customer care call center 26 that will excuse them from paying a penalty that is normally required by their contract for large queues or low service levels.

In an embodiment, the analysis and data view application 50 further may decide to change or adjust at least some of the algorithms used to predict at least one of future staffing levels, future staff assignments, future values of data, or future values of metrics in order to at least one of improve the accuracy of at least some of the predictions, reduce at least some future discrepancies, or reduce the number of associated actions and changes taken in response to the at least some future discrepancies. The algorithm change or adjustment made by the analysis and data view application 50 further may promote improving two or more operating parameters and/or metrics which may be generally thought to be mutually antagonistic.

Figure 2:
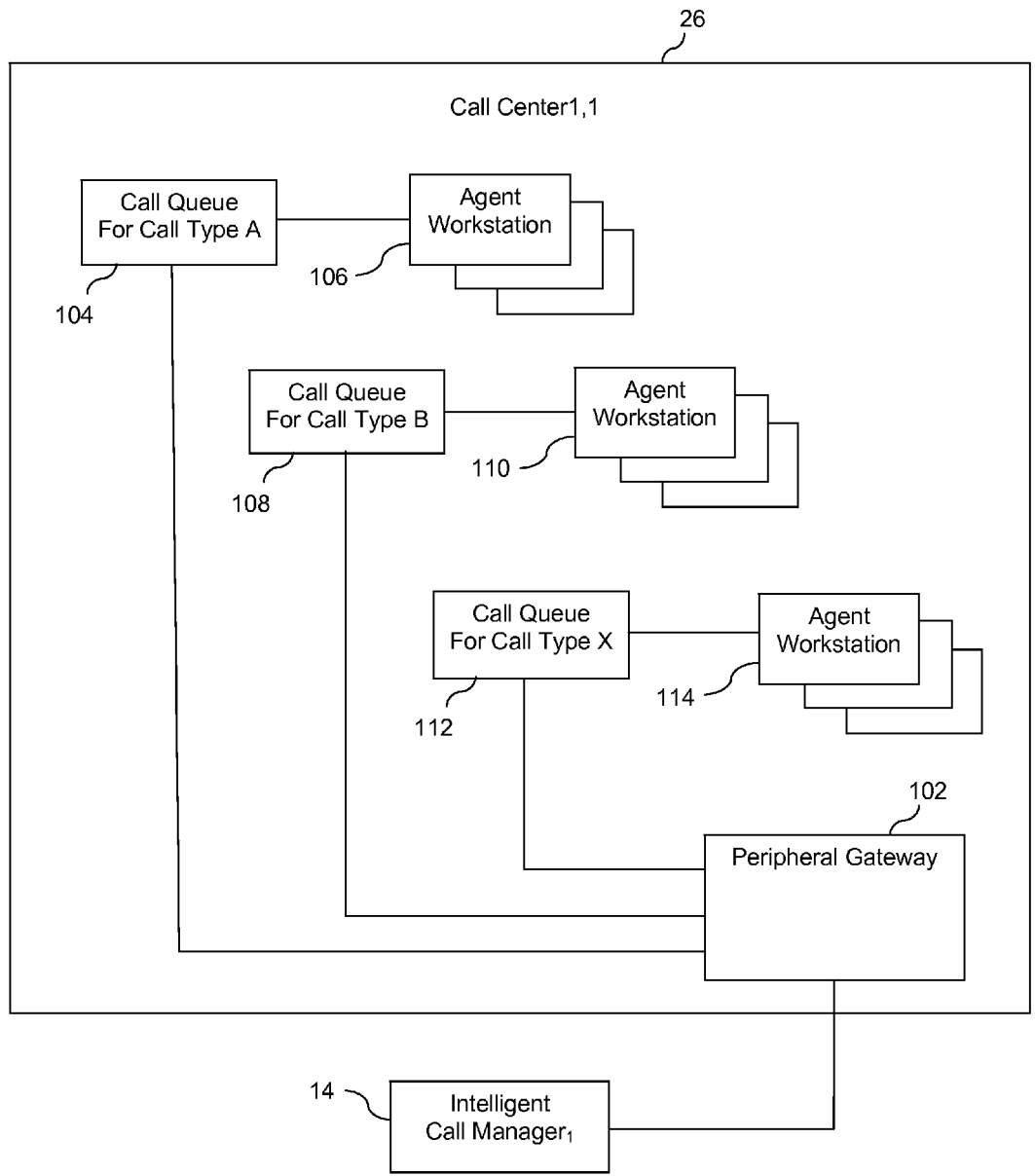
FIG. 2 is a block diagram of a customer care call center according to an embodiment of the disclosure.

Turning now to FIG. 2, the first customer care call center 26 is described. While a first customer care call center 26 and a first intelligent call manager platform 14 are shown, it is understood that there may be any number of intelligent call manager platforms 14, 18, or 22 and that there may be any number of customer care call centers 26, 28 or 30, 32, 34 or 36, and 38, 40 or 42. The first customer care call center 26 comprises a peripheral gateway 102, a first call queue for call type A 104 linked to a first customer care call agent workstation 106, a second call queue for call type B 108 linked to a second customer care call agent workstation 110, and a third call queue for call type X 112 linked to a third customer care call agent workstation 114. It is understood that there may be any number of call types A, B or X, that there may be any number of call queues for call types A, B or X 104, 108 or 112, and that there may be any number of customer care call agent workstations 106, 110 or 114. It is also understood that a call queue of any type A, B, or X may be associated with a plurality of customer care call agents working at a plurality of customer care call agent workstations 106, 110 or 114.

In an embodiment, the first intelligent call manager platform 14 receives a first inbound call of type A routed from the master router 12, the first intelligent call manager platform 14 pegs a counter for calls of type A, and routes the first inbound call of type A to the first customer care call center 26 which has assigned to it at least one of a plurality of customer care call agents who are appropriately trained to handle customer care calls of type A. The first customer care call center 26 receives the first inbound call of type A at the peripheral gateway 102. In an embodiment, the peripheral gateway 102 also may receive information from the first intelligent call manager platform 14 about the first inbound call of type A which indicates what type of call it is. Based on the information received about the first inbound call of type A, the peripheral gateway 102 routes the first inbound call of type A to a first call queue for call type A 104 which is linked to at least one of the first customer care call agent workstations 106 which is used by a first customer care call agent who is appropriately trained and assigned or gated to handle customer care calls of type A. If there is no appropriately trained first customer care call agent working at the first customer care call agent workstation 106 who is currently available and not busy, then the first inbound customer care call of type A waits in the call queue for call type A 104 until there is an appropriately trained first customer care call agent who is available and not busy. While the first inbound customer care call of type A is waiting in the call queue for call type A 104, a second inbound customer care call of type A that is routed by the first intelligent call manager platform 14 to the first customer care call center 26 also may be routed by the peripheral gateway 102 to the call queue for call type A 104 and wait for an appropriately trained second customer care call agent who is available and not busy.

In an embodiment, the analysis and data view application 50 retrieves data in real time from the first customer care call center 26 that indicate the number of calls waiting in the call queue for call type A 104, the number of calls waiting in the call queue for call type B 108 and the number of calls waiting in the call queue for call type X 112. The number of calls waiting in the call queue for call type A 104 may be considered a metric that measures the current call handling status of customer care call center 26 for customer care calls of type A and its real time value may be stored in the data store 52.

In an embodiment, the analysis and data view application 50 may retrieve real time customer care call data and metrics concerning customer care calls of the first type A from one or more of the first intelligent call manager 14, the first data store 16, the second intelligent call manager 18, the second data store 20, the third intelligent call manager 22 or the third data store 24, and store the real time customer care call data and metrics concerning customer care calls of the first type A in the data store 52. The analysis and data view application 50 further may display real time customer care call data and metrics concerning customer care calls of the first type A on display screens located at one or more of a plurality of first customer care call agent workstations 106 used by a plurality of customer care call agents qualified and assigned to handle customer care calls of the first category type A, wherein qualified means that an appropriate level of training has been received and an adequate level of skill has been demonstrated for handling that category of call. In an embodiment, one or more of the customer care call agents qualified to handle customer care calls of the first category type A, may be assigned to a second customer care call center 32 and may receive customer care calls of type A from a second intelligent call manager 18. For example, the analysis and data view application 50 may display on a display screen at the first customer care call agent workstation 106 a real time value for the number of calls waiting in the call queue for call type A 104. The analysis and data view application 50 may further display on the same display screen at the first customer care call agent workstation 106 a real time value determined from data stored in the data store 52 that represents the total number of all the calls waiting in a plurality of call queues for call type A where one or more of the plurality of call queues for call type A are located at one of customer care call centers 32, 34 or 36 which receive calls selectively routed by intelligent call manager 18, and customer care call centers 38, 40 or 42, which receive calls selectively routed by intelligent call manager 22.

Figure 3:
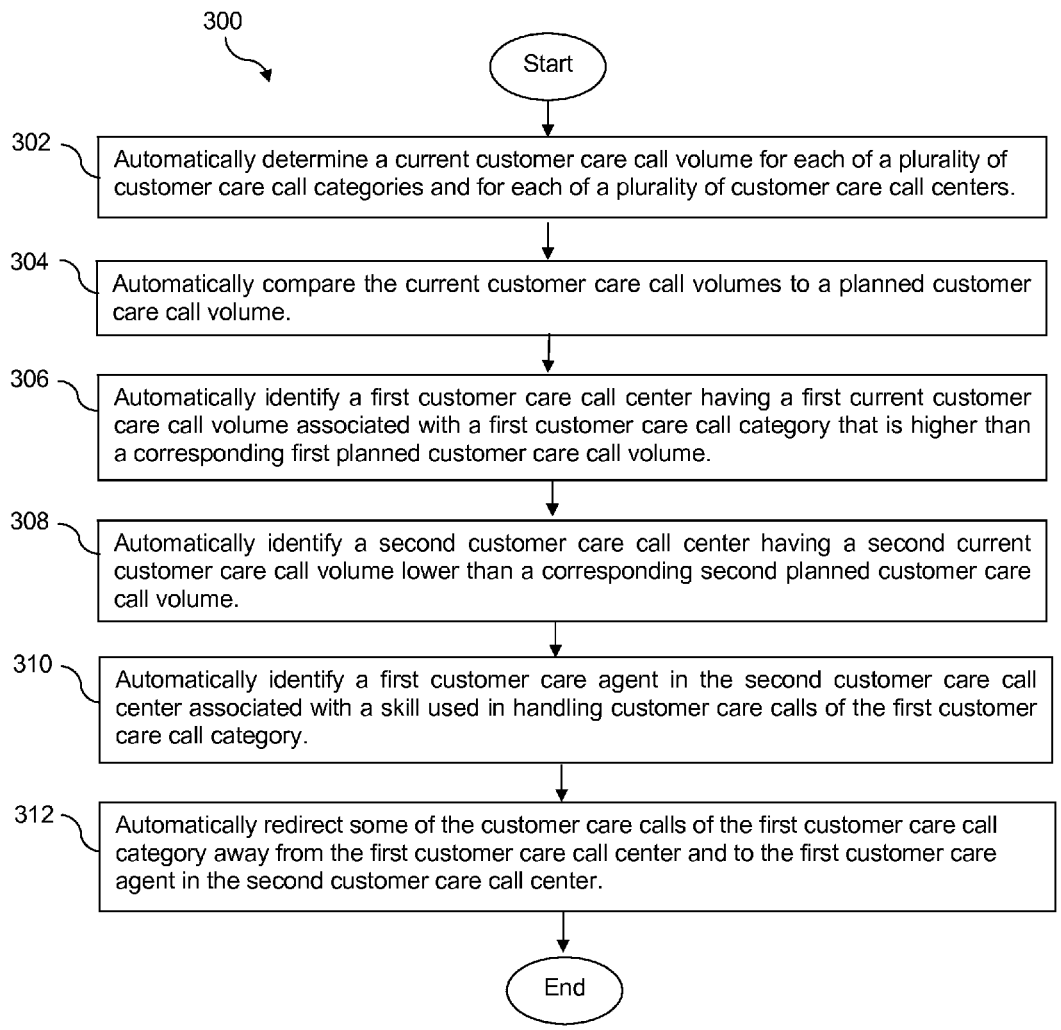
FIG. 3 is a flow chart of a method according to an embodiment of the disclosure.

Turning now to FIG. 3, a method 300 of customer care call handling comprising at least determining current customer care call volumes at customer care call centers, comparing current call volumes to planned call volumes, and selectively redirecting some of the customer care calls is described. At block 302 a current customer care call volume is automatically determined for each of a plurality of customer care call categories and for each of a plurality of customer care call centers. The determination of the current customer care call volume is based at least in part on the analysis and data view application 50 collecting customer care call metrics from each of a plurality of intelligent call management platforms 14, 18 and 22 wherein each intelligent call manager platform selectively routes customer care calls to some of the plurality of customer care call centers 26, 28 and 30, 32, 34 and 36, and 38, 40 and 42. In an embodiment, the customer care call metrics are collected and updated in real time, wherein for this context real time refers to at least once every minute. In an embodiment, each of the plurality of intelligent call management platforms 14, 18 and 22 selectively routes customer care calls based at least in part on the category of each call and on which customer care call centers 26, 28 and 30, 32, 34 and 36, and 38, 40 and 42 have at least one or more customer care call agents assigned to them that are qualified in the appropriate category, wherein qualified means that an appropriate level of training has been received and an adequate level of skill has been demonstrated for handling that category of call.

At block 304, current customer care call volumes are automatically compared to planned customer care call volumes. In an embodiment, the planned customer care call volumes are part of a call handling plan created by the workforce and performance management application 44 and retrieved from the data store 46 by the analysis and data view application 50. For example, a first planned customer care call volume for calls of category A is predicted by an IEX software application and stored in the data store 46. The analysis and data view application 50 retrieves the first planned customer care call volume for calls of category A from data store 46 and compares it to the current, real time, customer care call volume for calls of category A stored in the data store 52.

At block 306, a first customer care call center having a first current, real time, customer care call volume associated with a first customer care call category that is higher than a corresponding first planned customer care call volume is automatically identified. In an embodiment, the analysis and data view application 50 automatically analyzes the results of comparing current customer care call volumes to their corresponding planned customer care call volumes for each of the plurality of customer care call categories and for each of the plurality of customer care call centers 26, 28 and 30, 32, 34 and 36, and 38, 40 and 42 and identifies, a first customer care call center XX (not shown) that has a higher current customer care call volume for a first customer care call category F than the corresponding first planned customer care call volume for the same first customer care call category F.

At block 308, a second customer care call center having a second current customer care call volume lower than a corresponding second planned customer care call volume is automatically identified. In an embodiment, the analysis and data view application 50 automatically analyzes the results of comparing current customer care call volumes to their corresponding planned customer care call volumes for each of the plurality of customer care call categories and for each of the plurality of customer care call centers 26, 28 and 30, 32, 34 and 36, and 38, 40 and 42 and identifies, a second customer care call center YY (not shown) that has a lower current customer care call volume than the corresponding second planned customer care call volume.

At block 310, a first customer care call agent in the second customer care call center YY (not shown) associated with a skill used in handling customer care calls of the first customer care call category F is automatically identified. In an embodiment, the analysis and data view application 50 automatically identifies a first customer care call agent assigned to the second customer care call center YY (not shown) that is qualified to handle calls of category F.

At block 312, some of the customer care calls of the first customer care call category are automatically redirected away from the first customer care call center and to the first customer care call agent in the second customer care call center. In an embodiment, the analysis and data view application 50 automatically redirects some of the customer care calls of the first customer care call category F away from the first customer care call center XX (not shown) and to the first customer care call agent in the second customer care call center YY (not shown). In an embodiment, the analysis and data view application 50 automatically logs a record of each action that it takes to redirect some of the customer care calls, and the record is automatically stored in the data store 52, wherein the record comprises one or more of the date and time when the action was taken, the identity of the first customer care call center XX (not shown), the identity of the second customer care call center YY (not shown), the identity of the first customer care call agent, the identity of the first customer care call category F, the values of the current customer care call volumes for the first customer care call center XX (not shown) and for the second customer care call center YY (not shown), the values of the corresponding planned customer care call volumes, the projected future values of the corresponding customer care call volumes, and any other associated customer care call metrics. In an embodiment, the analysis and data view application 50 may further analyze the redirections taken, the log of the redirections taken, the stored associated customer care call metrics, and the trends of associated customer care call metrics before or after the redirections were taken, and the analysis and data view application 50 may adapt or change the process used to automatically redirect customer care calls.

In an embodiment, when the analysis and data view application 50 redirects at least some of the customer care calls of the first customer care call category F away from the first customer care call center XX (not shown) and to the first customer care agent in the second customer care call center YY (not shown), it may automatically grant an exception to one or more of the first customer care call center XX (not shown), and the second customer care call center YY (not shown), wherein the exception is associated with providing contractual relief. In an embodiment, the granted exception may be one of an issue exception and a staffing exception, wherein an issue exception is associated with a problem outside of the control of the subject customer care call center, and wherein a staffing exception is associated with either staffing fewer customer care call agents than planned or staffing more customer care call agents than planned.

For example, the mobile network operator may experience unexpected equipment problems that result in the current customer care call volumes at the first customer care call center XX (not shown) associated with the first customer care call category F being much higher than the corresponding planned first customer care call volumes. The analysis and data view application 50 may redirect some of the customer care calls of category F to the first customer care call agent at the second customer care call center YY and grant an issue exception to one or more of the first customer care call center XX (not shown) and the second customer care call center YY (not shown) so there is not a remuneration penalty if the occupancy metric exceeds its associated threshold value or the service level metric falls below its associated threshold value.

For another example, the current customer care call volumes at the first customer care call center XX (not shown) associated with the first customer care call category F may unexpectedly, for no known reason, become higher than the corresponding planned first customer care call volumes. The analysis and data view application 50 may redirect some of the customer care calls of category F to the first customer care call agent at the second customer care call center YY (not shown) and grant a staffing exception to one or more of the first customer care call center XX (not shown) and the second customer care call center YY (not shown) so they may increase their staffing levels above the level allowed contractually without receiving a remuneration penalty.

In addition to redirecting at least some of the customer care calls of the first customer care call category F away from the first customer care call center XX (not shown) and to the first customer care agent in the second customer care call center YY (not shown), and automatically granting an issue exception or a staffing exception, in a further embodiment, the analysis and data view application 50 may automatically adapt a staffing plan to release at least one customer care call agent earlier than planned or to retain at least one customer care call agent later than planned.

Figure 4:
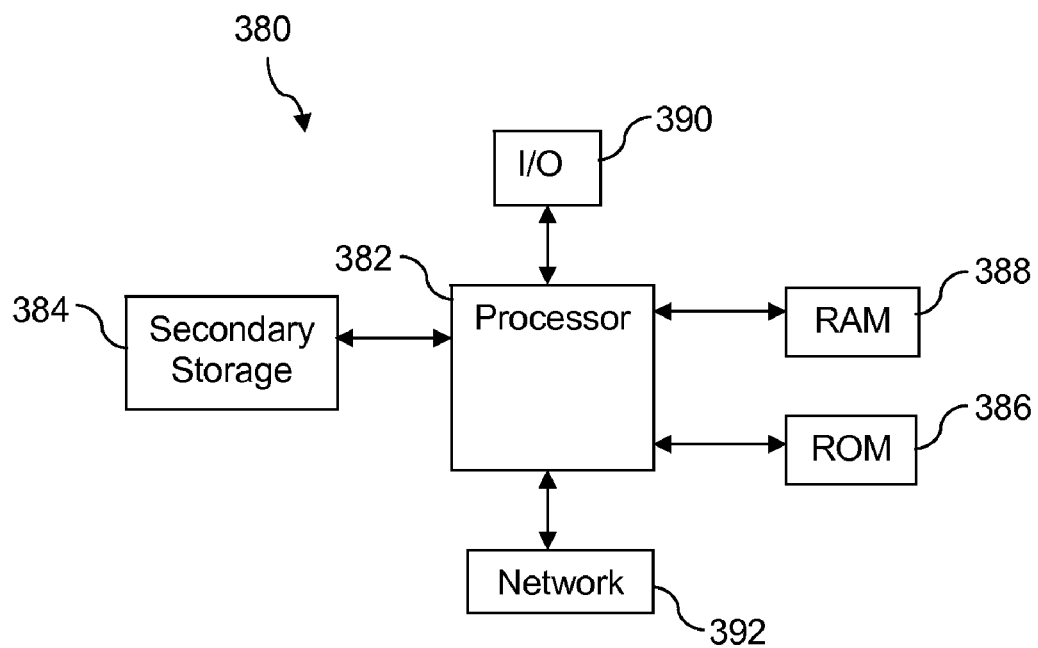
FIG. 4 illustrates an exemplary computer system suitable for implementing the several embodiments of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system, comprising:
a processor;
a memory; and
an application stored in the memory that, when executed by the processor,
collects customer care call metrics from at least three intelligent call management platforms, wherein each intelligent call management platform selectively routes customer care calls to an associated plurality of customer care call centers,
accesses historical customer care call metrics,
accesses forecasts of customer care call volumes at the plurality of customer care call centers associated with the at least three intelligent call management platforms,
accesses plans of customer care call agent staffing,
analyzes the customer care call metrics, the historical customer care call metrics, the forecasts of customer care call volumes, and customer care call agent staffing, wherein the analyzing integrates information from the at least three intelligent call management platforms with information accessed from a workforce and performance management platform, and wherein the integrated information is stored in a data store distinct from data stores associated with the intelligent call management platforms and distinct from a data store associated with the workforce and performance management platform;
grants an exception based on the analyzing, wherein the exception is associated with providing contractual relief to the customer care call center which excuses the customer care call center from paying a penalty normally required by their contract for increasing the staffing levels, wherein the exception is an issue exception and a staffing exception, wherein an issue exception is associated with a problem outside of the control of the customer care call center when the exception is the issue exception, and wherein a staffing exception is associated with either staffing fewer customer care call agents than planned or staffing more customer care call agents than planned when the exception is the staffing exception; and
based on a result of the analysis, reassigns at least one customer care call agent from a first customer care call category to a second customer care call category.

2. The system of claim 1, wherein the historical customer care call metrics comprise metrics about calls outbound from the customer care call centers.

3. The system of claim 1, wherein the customer care calls are related to mobile communications services.

4. The system of claim 1, wherein each intelligent call management platform routes customer care calls to the associated plurality of customer care call centers based on a category of the subject customer care call.

5. The system of claim 1, wherein the customer care call metrics comprise a current call handling status of the plurality of customer care call centers, and wherein the current call handling status comprises a customer care call category queue depth.

6. The system of claim 1, wherein granting the exception is further based on comparing current customer care call volumes to the forecasts of customer care call volumes.

7. The system of claim 1, wherein the application further adapts a staffing plan to release at least one customer care call agent earlier than planned or to retain at least one customer care call agent later than planned.

8. The system of claim 1, wherein the customer care call metrics that are collected from the at least three intelligent call management platforms reflect customer care call handling events that are less than one minute old.

9. The system of claim 1, wherein the application further logs redirection of the customer care calls and stores associated customer care call metrics.

10. The system of claim 9, wherein the application further analyzes the redirection by reviewing the log of redirection and the stored associated customer care call metrics.

* * * * *

UNITED STATES PATENT AND TRADEMARK OFFICE
CERTIFICATE OF CORRECTION

PATENT NO. : 8,391,465 B1
APPLICATION NO. : 13/016714
DATED : March 5, 2013
INVENTOR(S) : Shane Porter It is certified that error appears in the above-identified patent and that said Letters Patent is hereby corrected as shown below:

On the title page, at Item [73], please delete Assignee "Spring Communications Company L.P." and add Assignee -- Sprint Communications Company L.P. --.

Signed and Sealed this
Twenty-fifth Day of June, 2013

Teresa Stanek Rea
*Acting Director of the United States Patent and Trademark Office*